(12) United States Patent
Hakim et al.

(10) Patent No.: US 9,704,532 B2
(45) Date of Patent: Jul. 11, 2017

(54) CREATING AND VIEWING PREVIEW OBJECTS

(75) Inventors: Andy Hakim, San Jose, CA (US); Ken Goto, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 1198 days.

(21) Appl. No.: 12/014,046

(22) Filed: Jan. 14, 2008

(65) Prior Publication Data

US 2009/0183077 A1    Jul. 16, 2009

(51) Int. Cl.
*G06F 3/00* (2006.01)
*G11B 27/034* (2006.01)
*G11B 27/28* (2006.01)

(52) U.S. Cl.
CPC ............ *G11B 27/034* (2013.01); *G11B 27/28* (2013.01)

(58) Field of Classification Search
CPC ............ G06F 3/04842; G06F 3/03543; G06F 3/0481; G06F 3/0486; G06F 3/04817; G06F 3/04845; G06F 3/04812; G06F 3/0488; G06F 2203/014; G06F 3/016
USPC ................................................ 715/720, 723
See application file for complete search history.

(56) References Cited

U.S. PATENT DOCUMENTS

| | | | |
|---|---|---|---|
| 5,513,306 A * | 4/1996 | Mills et al. | 715/202 |
| 5,760,767 A | 6/1998 | Shore et al. | |
| 5,880,722 A | 3/1999 | Brewer et al. | |
| 6,052,492 A * | 4/2000 | Bruckhaus | 382/284 |
| 6,249,316 B1 | 6/2001 | Anderson | |
| 6,374,260 B1 * | 4/2002 | Hoffert et al. | |
| 6,400,378 B1 | 6/2002 | Snook | |
| 6,452,610 B1 * | 9/2002 | Reinhardt et al. | 715/716 |
| 6,545,687 B2 | 4/2003 | Scott et al. | |
| 6,675,174 B1 | 1/2004 | Bolle et al. | |
| 6,700,612 B1 | 3/2004 | Anderson et al. | |
| 6,734,909 B1 | 5/2004 | Terane et al. | |
| 6,912,327 B1 | 6/2005 | Hori et al. | |
| 6,919,910 B2 | 7/2005 | Chang | |
| 7,694,320 B1 * | 4/2010 | Yeo et al. | 725/41 |
| 2003/0122861 A1 * | 7/2003 | Jun et al. | 345/720 |
| 2004/0240005 A1 | 12/2004 | Kim | |
| 2005/0069283 A1 | 3/2005 | Mitsuyu | |
| 2005/0201628 A1 * | 9/2005 | Tojo | 382/239 |

(Continued)

FOREIGN PATENT DOCUMENTS

| | | |
|---|---|---|
| EP | 0920014 | 6/1999 |
| EP | 1513151 | 3/2005 |
| EP | 1746600 | 1/2007 |

OTHER PUBLICATIONS

Bruma, Cezar, Authorized Office, European Patent Office, PCT Application No. PCT/US2007/085377, filed Nov. 21, 2007, in International Search Report, 13 pages.

(Continued)

*Primary Examiner* — Di Xiao
(74) *Attorney, Agent, or Firm* — Chia-Hsin Chu; Page Ponsford; DLA Piper LLP US

(57) ABSTRACT

Generating a movie preview can include generating a preview object from frames associated with a media object and encoding the preview object for display in a display area. Based on a position of a control device within the display area, a frame can be selected from the preview object for display in the display area. Additionally, generating the preview object can include concatenating the frames to form a single image.

37 Claims, 10 Drawing Sheets

(56) References Cited

U.S. PATENT DOCUMENTS

| | | | |
|---|---|---|---|
| 2006/0008160 A1* | 1/2006 | Westphal et al. | 382/232 |
| 2006/0062363 A1 | 3/2006 | Albrett | |
| 2006/0064716 A1* | 3/2006 | Sull et al. | 725/37 |
| 2006/0224993 A1 | 10/2006 | Wong et al. | |
| 2007/0223878 A1 | 9/2007 | Abe et al. | |
| 2008/0080778 A1* | 4/2008 | Cheng et al. | 382/232 |
| 2008/0136790 A1* | 6/2008 | Hio | 345/173 |
| 2008/0148152 A1 | 6/2008 | Blinnikka et al. | |
| 2008/0155413 A1* | 6/2008 | Ubillos | 715/716 |
| 2008/0263448 A1* | 10/2008 | Oppenheimer | 715/719 |
| 2009/0031246 A1 | 1/2009 | Cowtan et al. | |

OTHER PUBLICATIONS

U.S. Non-Final Office Action for U.S. Appl. No. 11/771,777 dated Sep. 30, 2010, 47 pages.

\* cited by examiner

CREATING AND VIEWING PREVIEW OBJECTS

TECHNICAL FIELD

The present disclosure describes systems and techniques for creating and viewing preview objects.

BACKGROUND

Media content, such as one or more movies or collections of images, can be stored on and accessed over networks. The media content can also be shared with other users over the network. For example, movies can be hosted on various web portals within the network. Typically, a web portal displays a single frame to represent a movie such as in a thumbnail. A user can decide whether to download or access a movie based on the single displayed frame of the movie.

SUMMARY

In one aspect, a system for generating a movie preview can select frames of a movie, generate a preview object including the selected frames, and encode the preview object for display in a display area. Based on a position of a control device within the display area, a frame can be selected from the preview object for display in the display area.

In another aspect, a computer-implemented method is described. The method can include selecting frames of a movie, generating a preview object including the selected frames, and encoding the preview object for display in a display area. Based on a position of a control device within the display area, a frame can be selected from the preview object for display in the display area.

In another aspect, a medium bearing instructions is described. The instructions can enable one or more machines to perform operations including selecting frames of a movie, generating a preview object including the selected frames, and encoding the preview object for display in a display area. Based on a position of a control device within the display area, a frame can be selected from the preview object for display in the display area.

These and other aspects can include one or more of the following features. Selecting frames of the movie can include selecting frames at periodic time increments in the movie. Generating the preview object further can include arranging the selected frames in a temporal order. Encoding the preview object for display further can include encoding the preview object to render a key frame in the display area when the control device is associated with a position outside of the display area. The key frame can be included in the preview object. Generating the preview object can include concatenating the selected frames to form a single image. Encoding the preview object for display further can include encoding a portion of the single image to be displayed in the display area in accordance with the frame of the preview object selected for display in the display area. The control device can include a pointing device.

The systems and techniques described here may provide one or more of the following advantages. Advantages of using the preview object include allowing a user to quickly preview a movie before the user spends the time, effort, and/or cost associated with downloading or streaming the movie.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

A preview object, as discussed in this application, can be used to represent the content of a corresponding media object, such as a movie or a collection of images. The preview object can be generated using multiple frames or images selected from the corresponding media object. Further, the frames included in the preview object can be structured as a composited image (or "sprite"), which can be selectively displayed one portion at a time. Additionally, the preview object can be presented in a user-controllable manner to identify the content of the corresponding media object, such as before downloading or streaming of a movie is initiated or before a collection of images is accessed.

A movie can include multiple frames, each of which represents a single image of the movie. The movie also can include information indicating a temporal order for playback and the time for which each frame is to be displayed. Further, a digital representation of the movie can be encoded on a computer readable storage device. A collection of separate images can be logically and/or physically associated, such as in a file system or album.

Figure 1A:
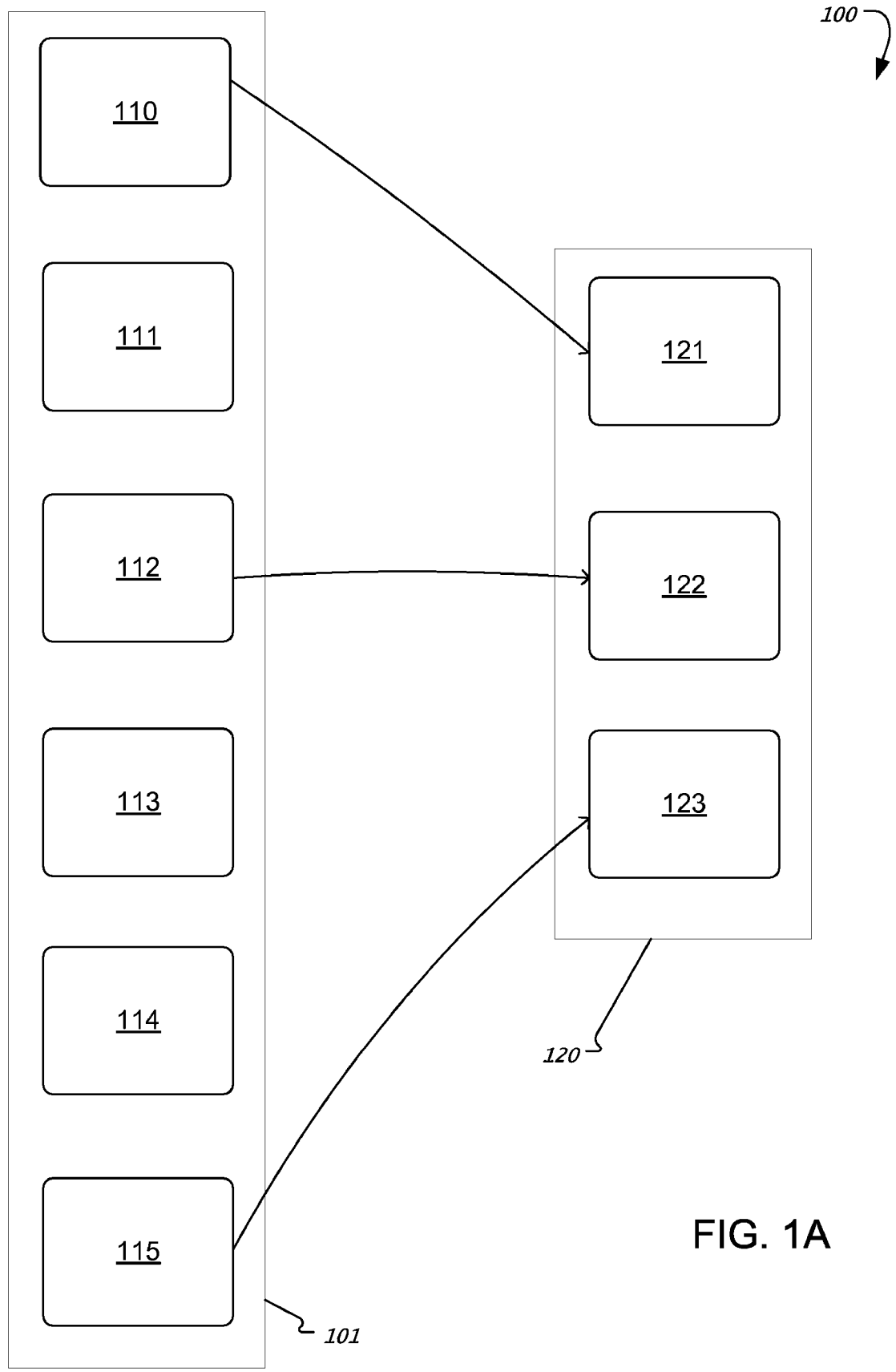
FIGS. 1A and B show examples of selecting content to generate a preview object.

FIG. 1A shows an example of selecting frames of a movie to generate a preview object. The movie 101 can be represented by a sequence of frames, such as frames 110-115. In performing the selecting process 100 used to generate the preview object, two or more frames can be selected from the movie 101. One or more of the frames can be selected manually, such as through a drag-and-drop operation or by designating the frame in an application. One or more of the frames also can be selected automatically, using a frame selection algorithm. For example, frames can be selected from the movie, or a portion of the movie, at a predetermined interval based on a factor, such as the number of available slides or time. Thus, the frames can be selected from the movie 101 through manual input, through automatic selection in accordance with predetermined criteria, or through a combination of both.

The selected frames can then be used to generate a preview object. In FIG. 1A, the frames of the preview object 120 include the first frame 110 of the movie 101 as frame 121, an intermediate frame 112 of the movie 101 as frame 122, and the last frame 115 of the movie 101 as frame 123. In some implementations, the temporal relationship between frames in the preview object 120 can differ from the temporal relationship between frames in the movie 101.

The frames selected for inclusion in the preview object 120 can have any distribution in the movie 101. For example, a predetermined number of frames, K, can be selected from the movie 101 for inclusion in the preview object 120. Further, the movie, or a portion of the movie, can be divided into K−1 increments. In one example, the K−1 increments can be equivalent increments of time. In another example, the K−1 increments can include approximately equivalent numbers of frames. Thus, the frame closest in time to the start of each time increment and the last frame of the last increment can be selected to produce a total of K frames. In some implementations, the number of frames that can be included in the preview object 120 can be limited to a predetermined maximum, such as 20 frames. Alternatively, any number of frames can be included in the preview object 120. Additionally, in some implementations, the selected frames of the preview object 120 can be represented in a lower resolution than the corresponding frames of the movie 101.

Figure 1B:
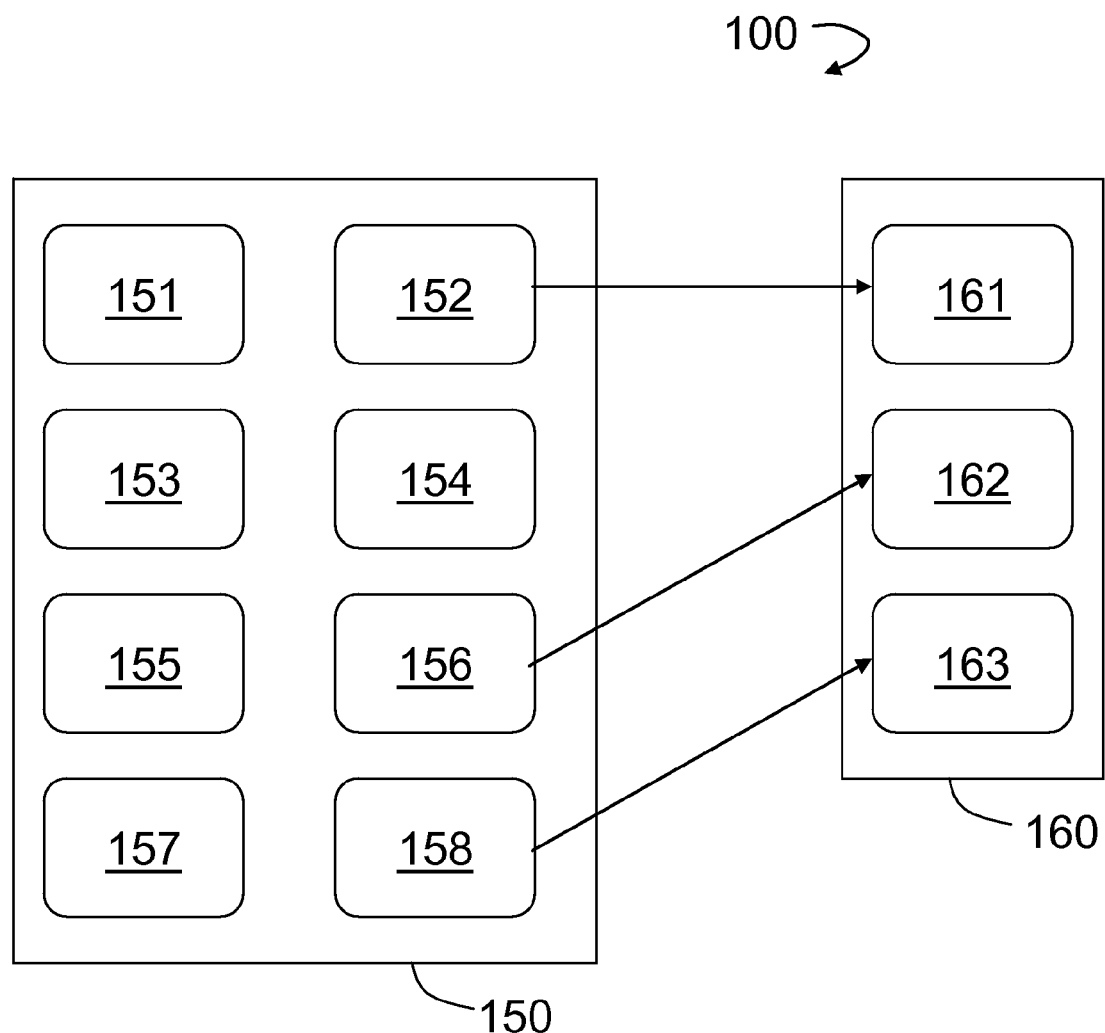

FIG. 1B shows an example of selecting separate images from a collection of images to generate a preview object. The collection of images 150 can be a physical and/or a logical organization of two or more separate images, such as an album or a directory in a file system. Further, the collection of images 150 can include multiple separate images, such as images 151-158. In performing the selecting process 100 used to generate the preview object 160, two or more images can be selected from the collection of images 150. As with the movie described with respect to FIG. 1A, one or more of the images can be selected manually, such as through a drag-and-drop operation or by designating the image in an application. One or more of the images also can be selected automatically, using an image selection algorithm. For example, images can be selected from the collection of images 150 based on one or more selection factors, such as the date associated with the image, the size of the image, the orientation of the image, or image content. Thus, the images can be selected from the collection of images 150 through manual input, through automatic selection in accordance with predetermined criteria, or through a combination of both.

The selected images can then be used to generate the preview object 160. In FIG. 1B, the preview object 160 includes frames 161-163, which correspond to images 152, 156, and 158 respectively. The frames of the preview object 160 can be ordered in any sequence. For example, the frames of the preview object 160 can be arranged based on the order in which the images to be included in the preview object 160 are selected from the collection of images 150. In some implementations, the preview object can be invalidated, such as by setting an associated flag, if an image that has been included in the preview object 160 is removed from the collection of images 150. The preview object 160 can then be modified using the current collection of images. Further, in some implementations, the number of frames that can be included in the preview object 160 can be limited to a predetermined maximum, such as 20 frames. Alternatively, any number of frames can be included in the preview object 160. Additionally, in some implementations, the selected frames of the preview object 160 can be represented in a lower resolution than the corresponding images of the collection of images 150.

Figure 2:
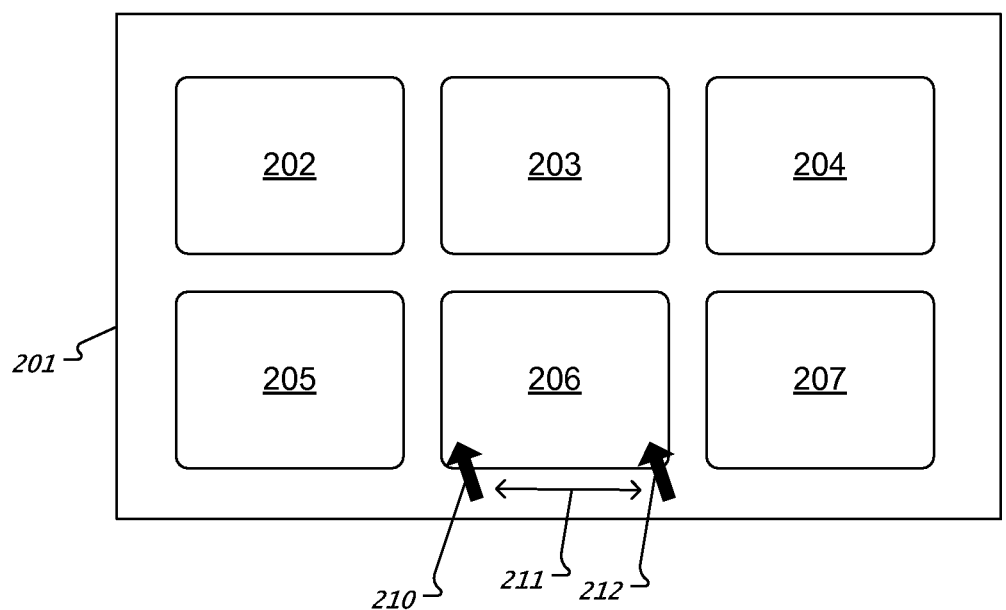
FIG. 2 shows an example of presenting a preview object within a collection of display areas.

FIG. 2 shows an example of presenting a preview object within a collection of display areas. Each display area can be associated with a movie. In some implementations, one or more display areas can be associated with a collection of separate images. A user interface 201 can be configured to present a collection of display areas 202-207. For example, a user interface can be a window or screen presented on a computer display, such as a web browser window. A display area, such as the display area 206, in the collection of display areas 202-207 can be associated with a movie and that movie can be associated with a corresponding preview object. Further, the display area 206 can depict a default frame of the movie associated with that display area. For example, the default frame can be one of the first frame of the movie, the last frame of the movie, the key frame of the movie, or an image associated with the movie, such as a movie poster. The key frame of the movie can be selected by a user or an appropriate algorithm as indicative of the movie's content.

When a user desires to view a preview object, the user can position an on-screen control device within the display area associated with the preview object and the corresponding movie, such as the display area 206. For example, the on-screen control device can be a cursor associated with a pointing device, such as a computer mouse or a touchpad, or a touch screen. Alternatively, the on-screen control device can be a designation controllable by a keyboard or any other device that can control a representation of a position within the user interface 201.

When the on-screen control device is positioned within the display area 206, such as at the position 210 at the left edge of the display area 206, the display area can display the first frame from the preview object associated with display area 206. When the on-screen control device is relocated to a position 212 at the right edge of the display area 206, the display area can display the last frame from the preview object.

Further, the on-screen control device can be positioned at any point in a range 211 between the position 210 at the left edge of the display area 206 and the position 212 at the right edge of the display area 206. Positioning the on-screen control device within the range 211 causes the frame of the preview object that corresponds to that position to be displayed in the display area 206. Thus, the on-screen control device can be moved across the display area 206 at any rate and in any sequence to cause one or more frames of the corresponding preview object to be displayed. In some implementations, advancement of a preview object's frames can be controlled by movement of the on-screen control device. For example, pausing the on-screen control device over a portion of the display area can cause the corresponding frame of the preview object to be displayed until the on-screen control device is moved. Alternatively, the frames of the corresponding preview object can be successively displayed once the on-screen control device is positioned within the display area. For example, hovering the on-screen control device over the display area can cause the frames included in the preview object to be shown in successive, temporal order, such as from the first frame of the preview object or from the frame corresponding to the position of the on-screen control device in the display area.

Figure 3:
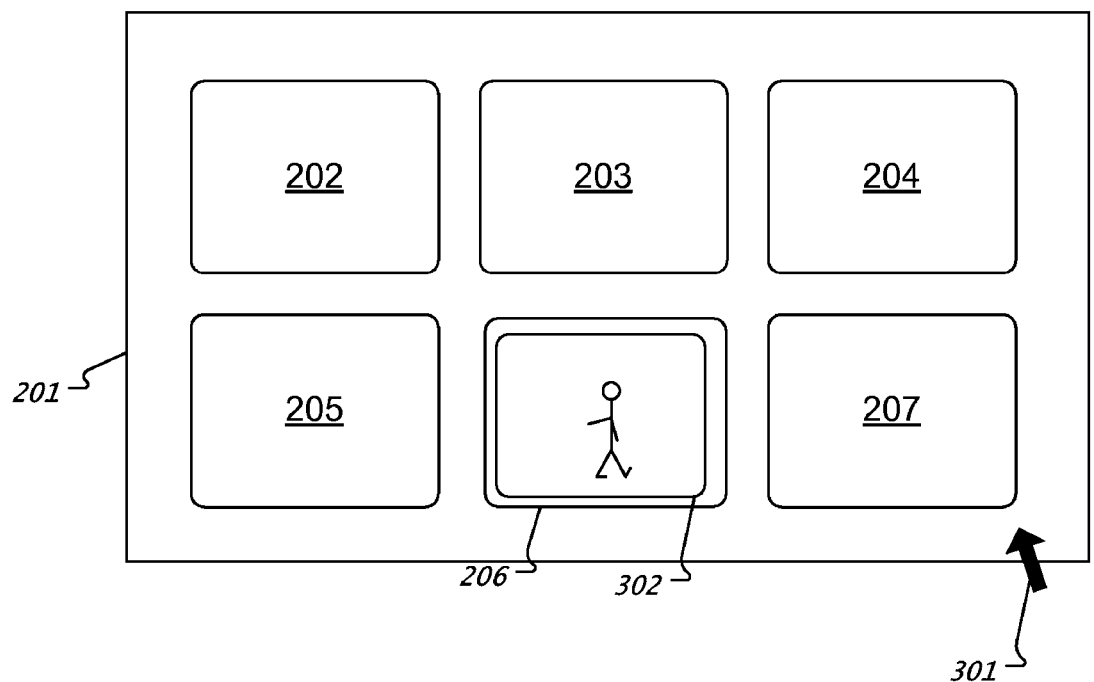
FIG. 3 shows an example of a display area showing a key frame.

FIG. 3 shows an example of a display area showing a key frame. When the on-screen control device is positioned outside of the display area 206, such as at position 301, the display area 206 can display a default image 302, such as a key frame associated with a movie or a collection of images. One or more other display areas included in the user interface 201, such as the display areas 202-205 and 207, also can display a default image when the on-screen control device is positioned outside of their respective boundaries. The default image 302 can be a frame that is included in the preview object associated with the display area 206. Alternatively, the default image 302 can be an image that is not included in the preview object associated with the display area 206. In either circumstance, an identifier indicating the default image 302 to be displayed when the on-screen control device is positioned outside of the display area can be associated with the preview object.

Figure 4:
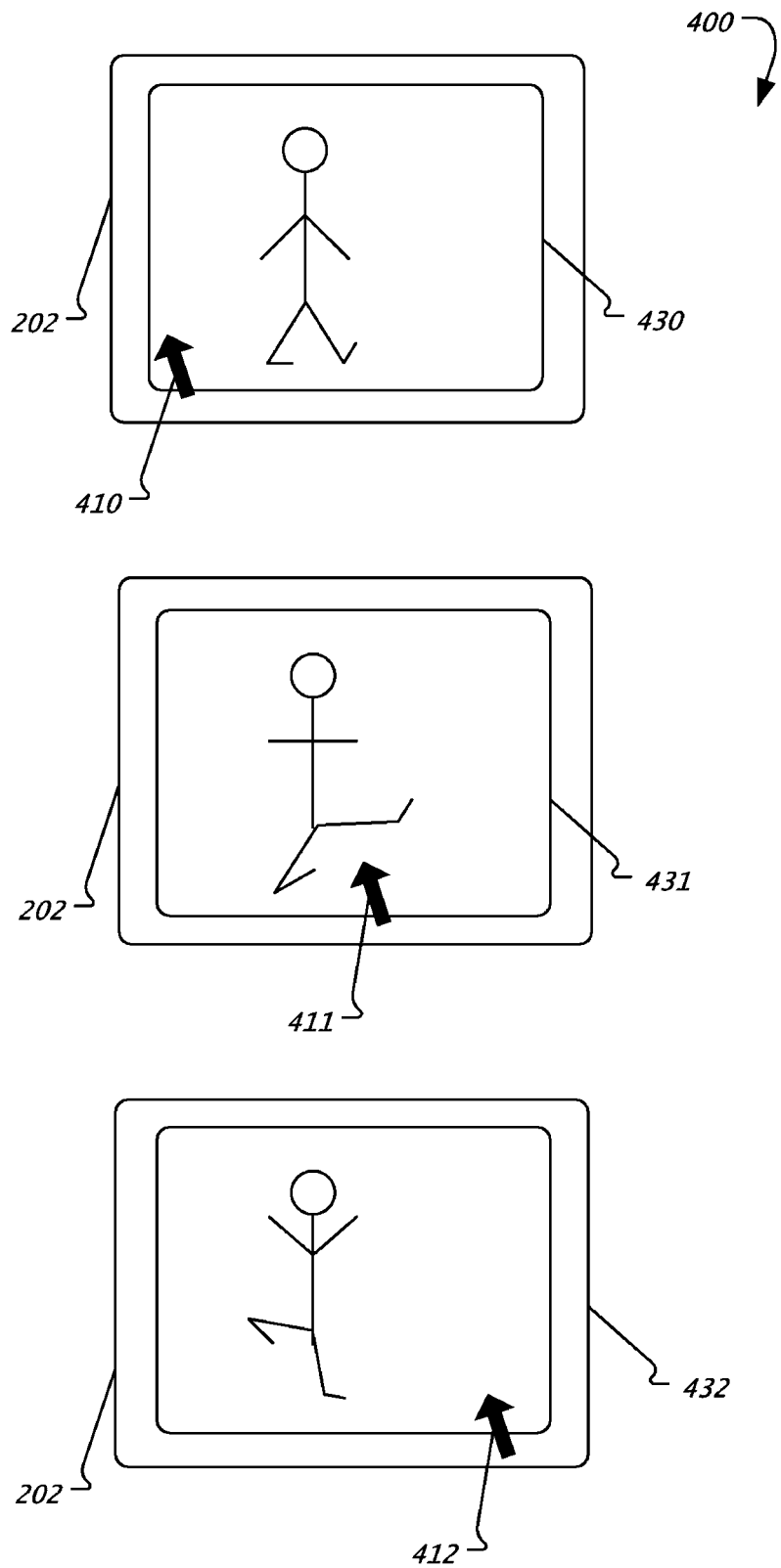
FIG. 4 shows an example of presenting a preview object by selecting multiple positions within a display area.

FIG. 4 shows an example of presenting a preview object by selecting multiple positions within a display area. As described above, a preview object can be associated with a movie or a collection of images represented by a display area, such as the display area 202. When an on-screen control device is located at a first position 410 within the display area 202, a corresponding first frame 430 of the preview object can be displayed. In some implementations, positioning the on-screen control device within the boundaries of the display area will cause the frames included in the preview object to be successively displayed, even if the on-screen control device remains motionless. Further, the display associated with the preview object can be advanced by moving the on-screen control device to a second position 411. The display area 202, responsive to the second position 411 of the on-screen control device, can display a corresponding frame 431 included in the preview object. In some implementations, the frame 431 can be temporally subsequent to the frame 430, such that the timeline of the preview object is advanced.

Additionally, the last frame 432 in the preview object can be displayed by repositioning the on-screen control device to a last position 412 within the display area 202. The display area 202, responsive to the last position 412 of the on-screen control device, can display the last frame 432 from the preview object. The on-screen control device can be repositioned to the left of its current position as well as to the right, and the frame of the preview object corresponding to the new position can be displayed in the display area. Thus, frames of the preview object can be displayed in any sequence. While three frames 430-432 are described in the example of FIG. 4, any number of frames can be displayed while the preview object is accessed. For example, there can be any number of intervening positions between positions the 410 and 411 that correspond to individual frames of the preview object. There also can be any number of intervening positions between the positions 411 and 412.

Figure 5:
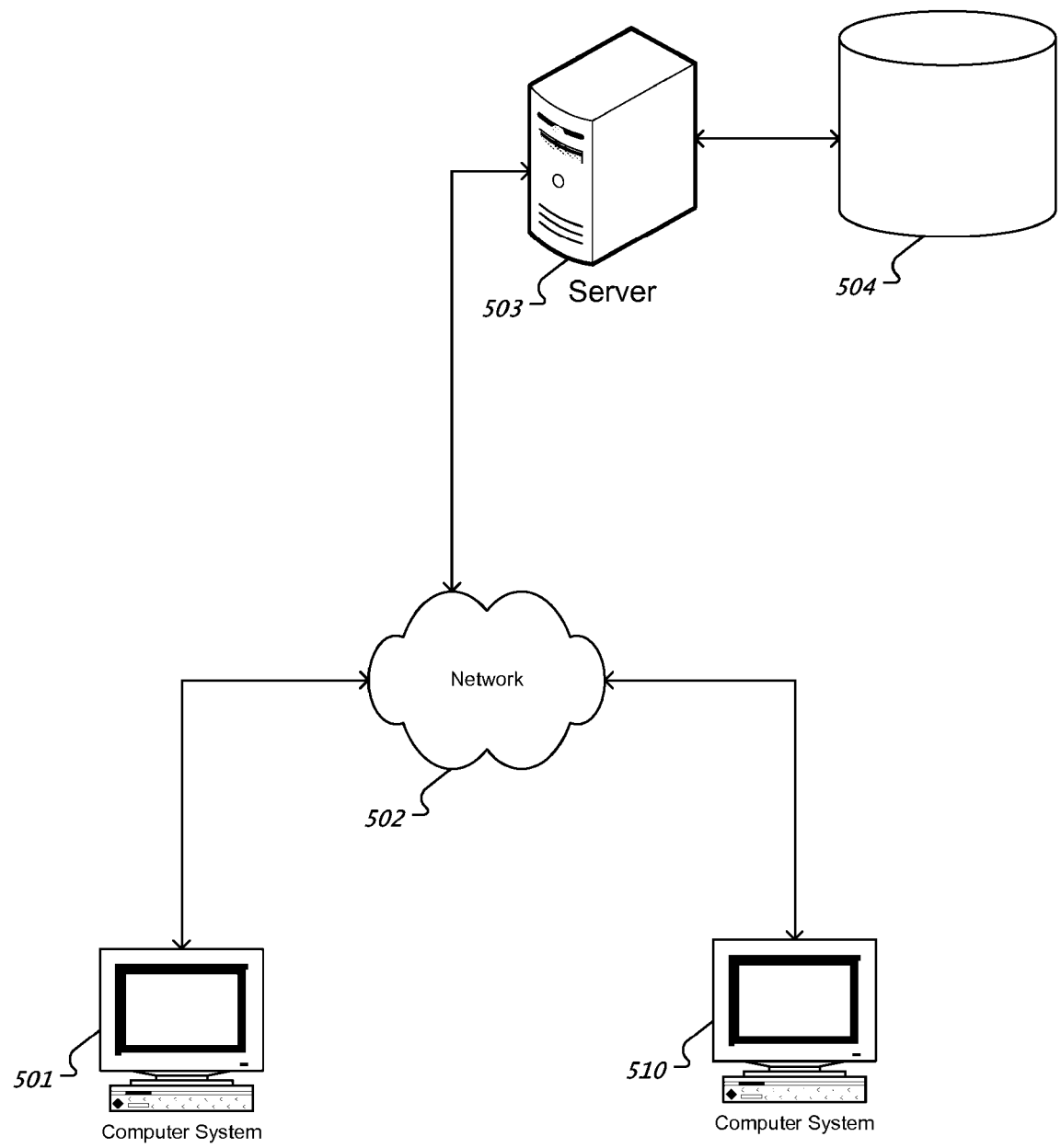
FIG. 5 shows an overview of a client/server system.

FIG. 5 shows an example of a client/server system that can be used for creating and displaying a preview object. A movie or a collection of images can be accessed on a computer system 501, 510 and a corresponding preview object can be generated in accordance with the methods described above. Thus, two or more images can be selected from the movie or the collection of images manually, automatically, or a combination thereof. The computer systems 501, 510 can be connected to the server 503 via a network 502. The network 502 can be a private network, such as a local area network, or a public network, such as the Internet. Further, the server 503 can be configured to store the movie or the collection of images, and the corresponding preview object in a file system 504. The file system 504 can reside on the server 503 or can be implemented in a separate device, such as a different server or a network attached storage device. The server 503 also can store one or more parameters on the file system 504, including parameters that can be used to generate and/or display a preview object. Furthermore, one or more custom parameters, including display control parameters, can be associated with a preview object and stored in the file system 504. In some implementations, the content of the file system 504 can be divided amongst multiple file systems.

Figure 6:
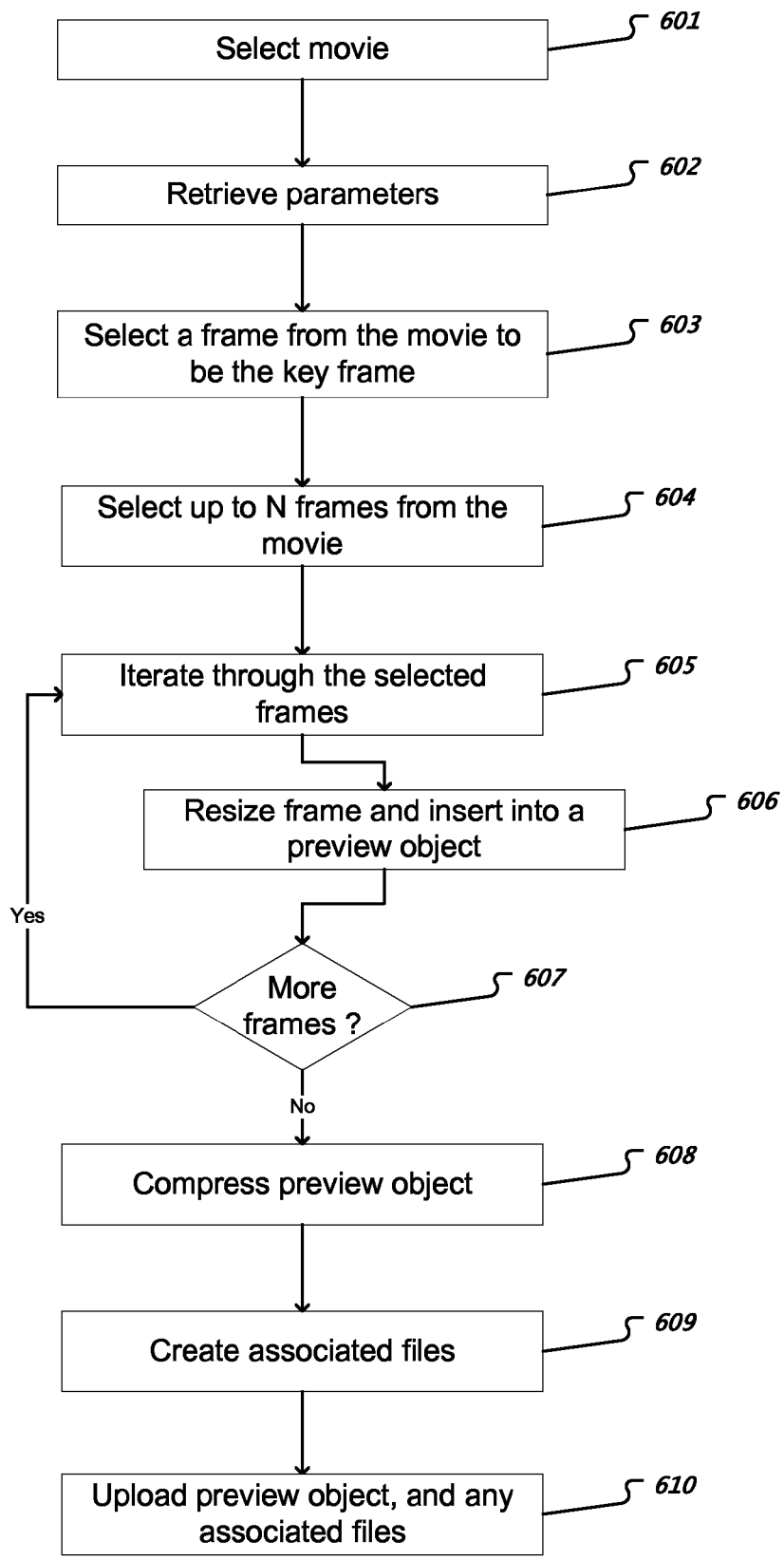
FIG. 6 shows a flowchart of an example of a method for creating a preview object and one or more associated files.

FIG. 6 shows a flowchart of an example of a method for creating a preview object and one or more associated files. A movie can be selected 601 for which a preview object and one or more associated files are to be created. For example, the movie can be selected in an application environment that supports the creation of a preview object, such as iMovie offered by Apple Inc. of Cupertino, Calif. In other implementations, a collection of separate images, such as an album, can be selected in an application environment that supports the creation of a preview object based on two or more separate images, such as iPhoto and/or Aperture also offered by Apple Inc.

One or more parameters for generating a preview object also can be retrieved 602. The one or more parameters can be established by a manager, such as the application developer or a administrator of a forum in which the movie and associated preview object can be hosted. In some implementations, the one or more parameters can be retrieved from a storage device local to the computer system on which the preview object is created. Alternatively, the one or more parameters can be retrieved from a remote storage device, such as a server, over a network.

The one or more parameters can be used to control how the preview object is generated. For example, the parameters can include the Boolean parameter scrubSpriteEnabled that indicates whether a preview object can be generated and/or uploaded to the host environment. The default value of scrubSpriteEnabled can be initialized to true. The parameters also can include a scrubSpriteFrameWidth expressed as an integer that defines the width of the preview object frame in pixels. The default value of scrubSpriteFrameWidth can be set to any desired pixel width, such as 180. In some implementations, the corresponding frame height can be determined based on the aspect ratio of the movie. Further, the parameters can include a scrubSpriteFrameCount expressed as an integer that indicates the number of frames that can be included in the preview object. The default value of scrubSpriteFrameCount can be set to any number of desired frames based on factors such as performance and file size. For example, the number of frames can be set to 20. Additionally, the parameters can include one or more quality values, such as a scrubSpriteQuality that defines the degree of compression to which a preview object frame is subjected and a posterFrameQuality that defines the degree of compression to which a poster frame image associated with the movie is subjected. The scrubSpriteQuality and the posterFrameQuality can be represented as a real number or an integer. For example, a quality index can include values between 0.0, representing maximum compression, and 1.0, representing no compression. The default scrubSpriteQuality and the default posterFrameQuality can be set to any desired compression value, such as 0.7 and 0.9 respectively.

A frame from the movie can be selected 603 to be the key frame in the preview object, which can be displayed until an on-screen cursor is positioned within the display area corresponding to the preview object. Further, up to N additional frames can be selected from the movie for inclusion in the preview object 604. As discussed above, the frames can be selected manually, automatically, or both manually and automatically. The number of frames, N+1, that can be included in the preview object can be established based on any criteria, including system performance, available storage, and movie size.

In some implementations, the spacing between the frames can be approximately the same, such as with respect to time or a sampling ratio. The N frames also can include the first and/or last frames of the movie, but need not include either. The selected frames, including the key frame, are iterated through 605. For each frame, the frame can be resized 606 according to the frame width value that was retrieved 602. In some implementations, the height of the resized frame can be derived from the movie's aspect ratio. The resulting resized frame can be inserted into the corresponding preview object. In some implementations, the preview object can be created when the first frame is inserted. When there are more frames to process, the loop continues 607. When all of the selected frames have been iterated through and the loop is finished, the preview object can be compressed 608 according to one or more image quality parameters that were retrieved 602, such as the scrubSpriteQuality parameter.

Further, the selected frames can be structured as a composited image. In some implementations, the preview object can use the Joint Photographic Experts Group (JPEG) ISO standard 10918 file format in which all of the preview object frames can be concatenated together to form a single image. In such implementations, inserting the resized frame into the preview object 606 concatenates the resized frame below the existing frame. After all of the frames of the preview object have been concatenated together, the preview object can be transformed into a single image.

Figure 7:
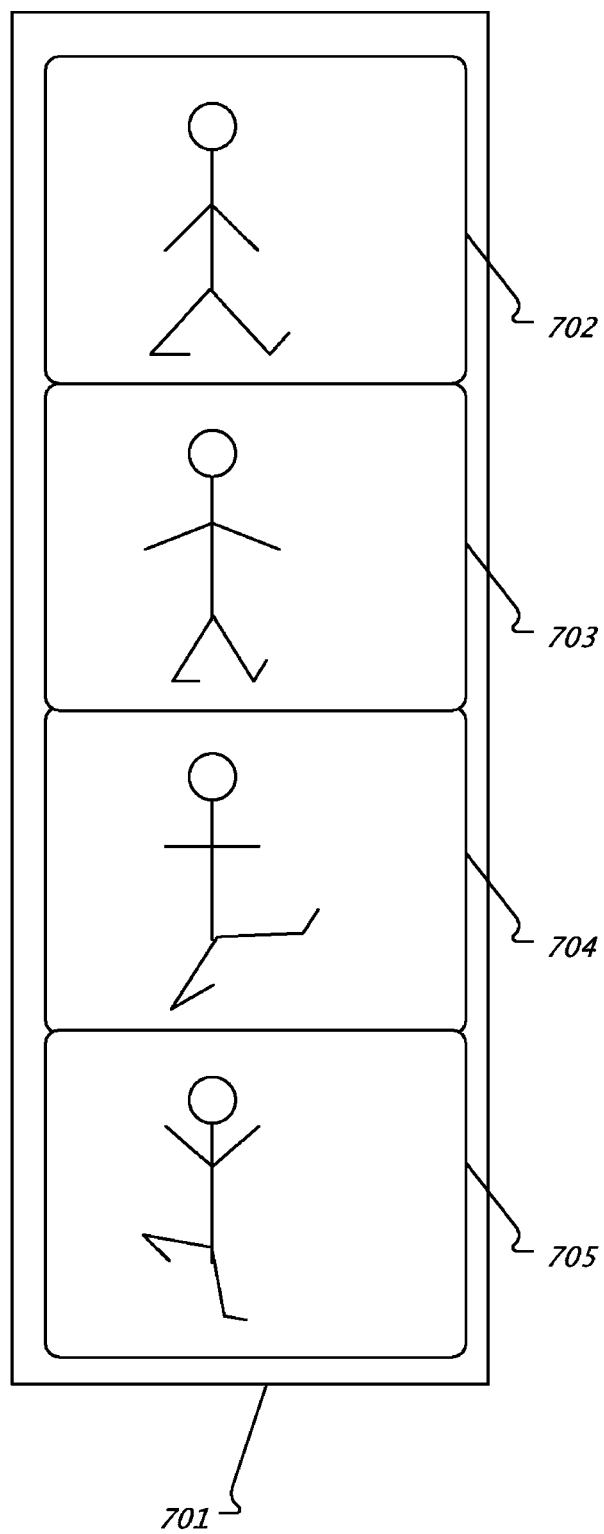
FIG. 7 shows an example of a preview object in which the frames have been concatenated.

FIG. 7 shows an example of a preview object in which the frames have been concatenated. The preview object 701 includes frames 702-705, which have been selected from a corresponding movie. Each of the frames included in the preview object 701 can be scaled to a uniform size. For example, in some implementations, the frames included in the preview object can be sized to 180 pixels in width and 100 pixels in height. Further, each of the frames included in a preview object can be encoded in accordance with a common file format, such as the JPEG file format. The frames included in the preview object also can be concatenated with one another to form a single image, such as in the preview object 701. In one example, vertically concatenating 20 frames, each with dimensions 180 pixels in width by 100 pixels in height results in an image with dimensions of 180 pixels in width by 2000 pixels in height. In another example, the frames included in the preview object can be concatenated horizontally, such that concatenating 20 frames, each with dimensions of 180 pixels in width by 100 pixels in height, results in an image with dimensions of 3600 pixels in width by 100 pixels in height. While FIG. 7 shows four frames 702-705 included in the preview object 701, any number of frames can be included in a preview object.

Returning to FIG. 6, one or more files associated with the preview object also can be created 609. An associated file can include information (or metadata) about the movie corresponding to the preview object, such as a movie description file or a poster frame file that contains a copy of the key frame. A movie description file also can include one or more of the following: a flag to indicate whether the movie has an associated preview object, an identifier, such as a scrubSpritePath, indicating the filename of the file containing the associated preview object, values, such as the scrubSpriteFrameWidth and scrubSpriteFrameHeight describing the width and height of the frames included in the preview object, a value, such as a scrubSpriteFrameCount, that indicates the number of frames included in the preview object, and an index, such as a scrubSpriteKeyFrameIndex, identifying the frame in the preview object that has been selected 603 as the key frame.

The preview object and any associated files, including the corresponding movie, also can be uploaded 610 to the server 503. Alternatively, the preview object and/or any associated files can be created directly on a server. In other implementations, the movie corresponding to the preview object already can be stored on a server. Thus, the preview object corresponding to the movie and any associated files can be subsequently stored on a server. If the preview object is to be modified, the above-mentioned tasks can be repeated to generate the modified preview object. Additionally, the preview object can be encoded in such a manner as to enable the preview object to be viewed in a display area corresponding to the movie. For example, the preview object can be encoded using JavaScript®.

Figure 8:
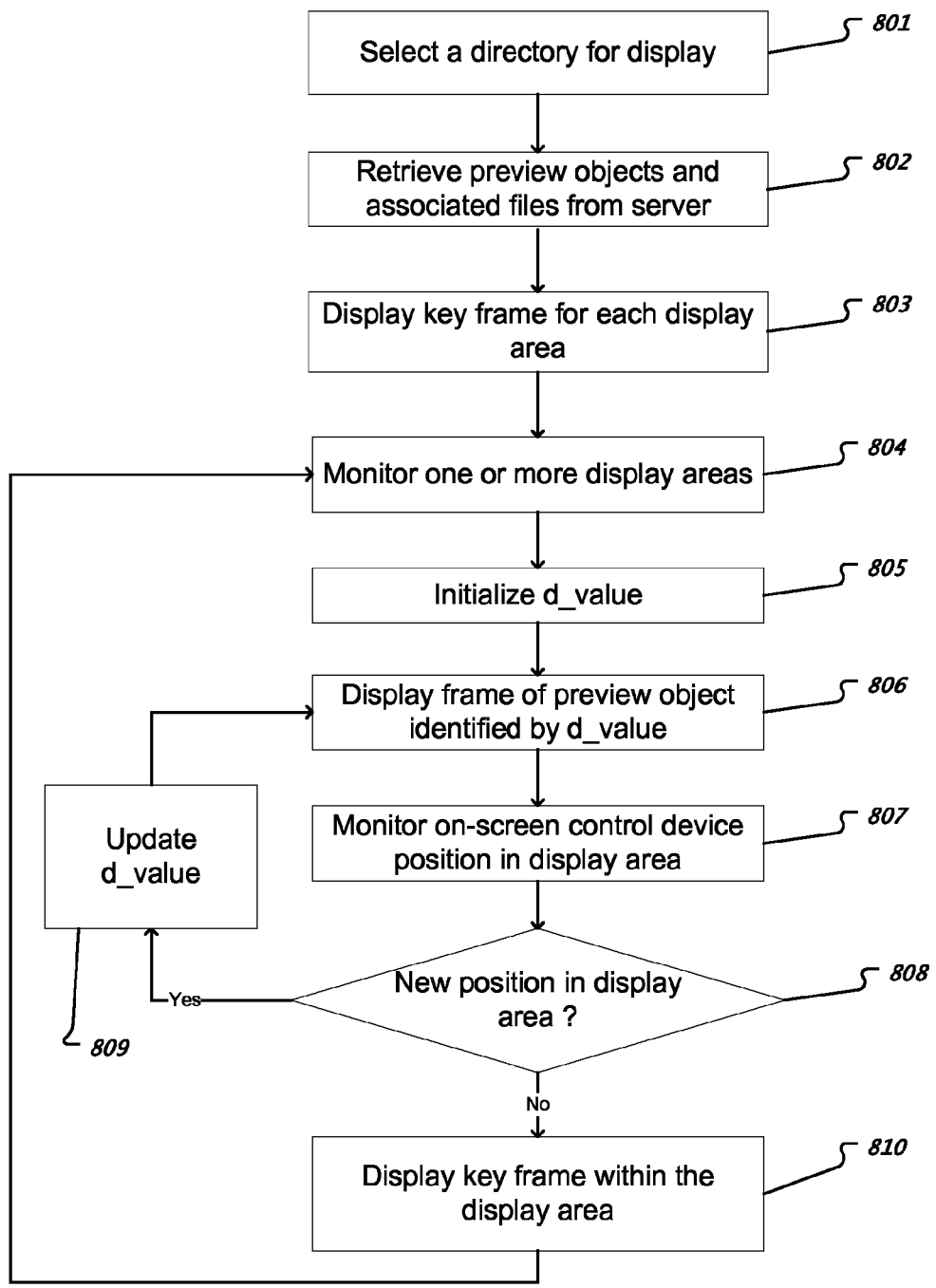
FIG. 8 shows a flowchart of an example method for displaying a preview object.

FIG. 8 shows a flowchart of an example method for displaying a preview object. A directory, such as a web page or storage location, that includes representations associated with one or more movies can be selected 801 for display in a user interface. Thus, information associated with the directory can be retrieved from a server. For example, the user interface can be a window associated with an application, such as a web browser, which can receive and execute JavaScript® code within in hypertext markup language (HTML) documents. The JavaScript® code can control the user interface to monitor input, such as movement associated with an on-screen device, and display one or more frames associated with a corresponding preview object. In some implementations, the directory can include one or more collections of images instead of or in addition to the one or more movies. Additionally, one or more preview objects and associated files, such as a movie description file, corresponding to the one or more movies also can be retrieved 802 from a server. In some other implementations, the one or more preview objects and associated files can be retrieved from local storage.

The user interface can present a display area for each movie and/or collection of images included in the directory. The display area can be configured to display 803 the key frame of the preview object for the associated movie as a default image while the on-screen control device remains outside of the bounds of the display area. The user interface monitors the one or more display areas to determine whether the on-screen control device has entered 804 a display area. When the on-screen control device is positioned within the boundaries of a display area, a value, d_value, for use in displaying the frames of the preview object within the display area can be initialized 805. The d_value can be initialized to a value that represents a frame of the preview object according to the position of the on-screen control device within the display area. For example, if the position of the on-screen control device represents the first frame of the preview object, the d_value can be set to zero. Further, if the position of the on-screen control device represents the Mth frame of the preview object, the d_value can be set to a value identifying the first row or column of the preview object that corresponds to the Mth frame. The frame, as identified by the d_value, of the preview object can be displayed 806 in the display area.

The user interface continues to monitor 807 the position of the on-screen control device relative to the display area when the on-screen control device is positioned within the boundaries of the display area. Upon detecting that the on-screen control device has been moved to a new position, the user interface can determine whether the on-screen control device remained within the display area 808. If the on-screen control device has moved to a position within the display area that corresponds to a different frame of the preview object, the d_value can be updated 809. For example, a movement to the right within the display area can result in d_value being incremented. If the movement corresponds to advancing one frame, the d_value can be incremented by a dimension, height or width, of one frame of the preview object. For example, if the preview object is vertically concatenated, d_value can be incremented by the height of one frame of the preview object. Alternatively, if the preview object is horizontally concatenated, d_value can be incremented by the width of one frame of the preview object. If the movement corresponds to advancing multiple frames, the d_value can be incremented by a value equivalent to the dimension of the corresponding number of frames. A movement to the left within the display area can result in d_value being decremented. If the movement corresponds to reversing one frame, the d_value can be decremented by a dimension, height or width, of one frame of the preview object. If the movement corresponds to reversing multiple frames, the d_value can be decremented by a value equivalent to the dimension of the corresponding number of frames. If a movement has both a vertical component and a horizontal component, the user interface can ignore the vertical component for purposes of determining the change to the d_value. Alternatively, both the vertical and horizontal components of the movement can be used to determine the change to the d_value. In some implementations, the velocity of the movement also can be used to determine the amount by which the d_value is incremented or decremented. Further, if a change to the d_value would result in the d_value passing either the beginning or end of the preview object, the change to the d_value can be rejected. When the d_value is changed, the user interface can display 806 the frame of the preview object that corresponds to the d_value. In some implementations, when the currently displayed frame of the preview object is changed to a new frame that is not contiguous with the currently displayed frame, the new frame is displayed without first displaying any intervening frames of the preview object. In other implementations, when the currently displayed frame of the preview object is changed to a new frame that is not contiguous with the currently displayed frame, the user interface can show one or more intervening frames before displaying the new frame, such as by fading the intervening frames in and out of the display area.

In the event that the on-screen control device is moved to a position outside of the display area 808, the key frame can once again be displayed in the display area. Further, the user interface can continue to monitor each of the display areas to determine whether the on-screen control device has entered a display area 804.

As the on-screen control device is moved within a display area, such as the display area 202, frames from the corresponding preview object can be displayed in the display area. In an implementation in which the frames of the preview object are stored as concatenated images in a JPEG file, individual frames of the preview object can be selected using the following HTML code fragment:

```
<DIV style ="overflow:hidden">
    <IMG src="previewobj.jpg" style= "position: absolute;
    top: 100px" />
</DIV>
```

A frame included in the preview object represented by the file previewobj.jpg can be displayed by using an IMG (inline image) tag contained in a division defined by a DIV (division) tag. The division can be sized to show only one frame included the preview object. Thus, the next frame within the preview object can be displayed by incrementing the value associated with the IMG "top" Cascading Style Sheets (CSS) style in the HTML code fragment. The amount by which the value is incremented can correspond to the height of one frame of the preview object. Accordingly, moving an on-screen control device from a first position to a second position within a display area can cause the d_value associated with the display area to be incremented and the frame of the preview object indicated by the d_value can be presented in the display area.

In some implementations in which frames of the preview image have been concatenated vertically, when the frame of a preview object indicated by the d_value is displayed 806, the d_value can be multiplied by the frame's height to determine the IMG "top" style in the HTML code fragment shown above. In other implementations using vertical concatenation, the d_value can include the frame height multiplication factor. Further, in some implementations in which frames of the preview image have been concatenated horizontally, the d_value can be multiplied by the frame's width and the appropriate IMG style format can be used to display the corresponding frame of the preview object. In other implementations using horizontal concatenation, the d_value can include the frame width multiplication factor.

When a frame of the preview object cannot be rendered in a display area by the user interface, the user interface can display a substitute image. For example, the key frame associated with the preview object can be selected as the substitute image. In other implementations, the user interface can display the next available frame included in the preview object that can be rendered. If no remaining frames of the preview object can be rendered, an image that indicates a missing or corrupt image can be presented in the display area.

Figure 9:
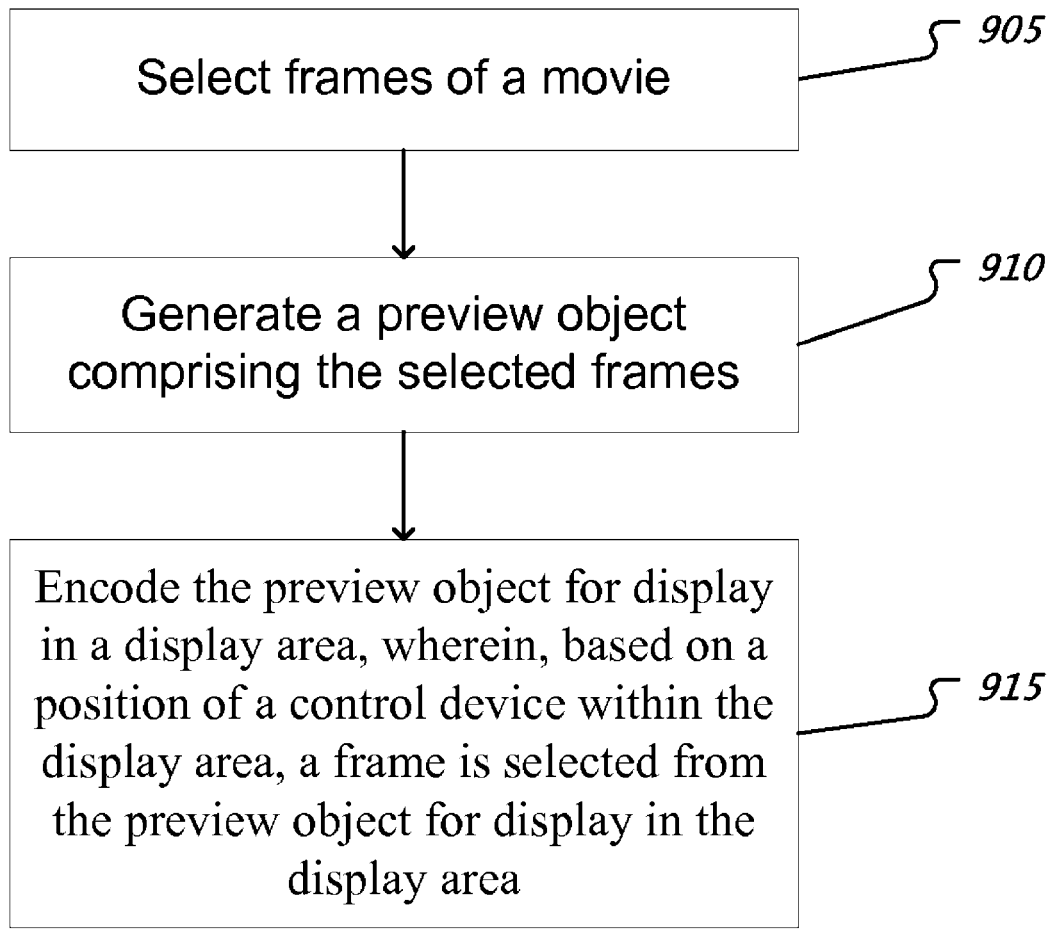
FIG. 9 shows an example flowchart for generating a movie preview.

FIG. 9 shows an example flowchart for generating a movie preview. Initially, frames of a movie are selected 905. Further, a preview object comprising the selected frames is generated 910. Once the preview object has been generated, the preview object can be encoded for display in a display area, wherein, based on a position of a control device within the display area, a frame is selected from the preview object for display in the display area 915. In other implementations, the movie from which frames are selected can be replaced by a collection of images, such as an album, which includes two or more separate images that can be used to generate the preview object.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, near-touch input, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the subject matter. For example, the Portable Network Graphics (PNG) file format can be used instead of the JPEG file format. Furthermore, the display area can be configured to sequential display all of the frames contained in a preview object upon a single user command. Accordingly, other implementations are within the scope of the following claims.

What is claimed is:

1. A method of generating a movie preview, the method comprising:
    receiving a selection of a plurality of frames of a movie;
    generating a preview object including the plurality of frames, wherein generating the preview object comprises concatenating the plurality of frames to form a single image comprising a plurality of different portions, wherein each portion of the plurality of different portions respectively corresponds to one of the plurality of frames of the movie, wherein concatenating the plurality of frames to form the single image includes vertically or horizontally concatenating the frames to form the single image; and
    encoding the preview object for display in a display area such that:
        based on different positions of a control device within the display area, the different portions of the single image are individually selected for display in the display area, and
        only one portion of the plurality of different portions of the single image corresponding to only one of the frames of the movie is displayed in the display area at a time.

2. The method of claim 1, wherein receiving the selection of the plurality of frames of the movie comprises receiving frames selected at periodic time increments in the movie.

3. The method of claim 1, wherein generating the preview object further comprises arranging the plurality of frames in a temporal order.

4. The method of claim 1, wherein encoding the preview object for display further comprises encoding the preview object to render a key frame in the display area when the control device is associated with a position outside of the display area.

5. The method of claim 4, wherein the key frame is included in the preview object.

6. The method of claim 1, wherein the control device comprises a pointing device.

7. The method of claim 1, wherein the preview object is encoded for display in the display area such that whatever portion of the plurality of different portions in the single image is displayed fills the entire display area.

8. The method of claim 1, wherein generating the preview object includes concatenating the plurality of frames and additional frames from the movie to form the single image.

9. The method of claim 8, wherein the additional frames are automatically selected from the movie based on a criteria.

10. The method of claim 9, wherein each portion of the plurality of different portions respectively corresponds to one of the plurality of frames and a subset of the additional frames.

11. The method of claim 1, wherein concatenating the plurality of frames to form the single image comprises: vertically concatenating the frames to form the single image.

12. The method of claim 1, wherein concatenating the plurality of frames to form the single image comprises: horizontally concatenating the frames to form the single image.

13. A non-transitory computer-readable medium comprising computer program product; operable to cause data processing apparatus to perform operations comprising:
    receiving a selection of a plurality of frames of a movie;
    generating a preview object including the plurality of frames, wherein generating the preview object comprises concatenating the plurality of frames to form a single image comprising a plurality of different portions, wherein each portion of the plurality of different portions respectively corresponds to one of the plurality of frames of the movie, wherein concatenating the plurality of frames to form the single image includes vertically or horizontally concatenating the frames to form the single image; and
    encoding the preview object for display in a display area such that:
        based on different positions of a control device within the display area, the different portions of the single image are individually selected for display in the display area, and
        only one portion of the plurality of different portions of the single image corresponding to only one of the frames of the movie is displayed in the display area at a time.

14. The non-transitory computer-readable medium of claim 13, further operable to cause data processing apparatus to perform operations comprising receiving frames selected at periodic time increments in the movie.

15. The non-transitory computer-readable medium of claim 13, further operable to cause data processing apparatus to perform operations comprising arranging the plurality of frames in a temporal order.

16. The non-transitory computer-readable medium of claim 13, further operable to cause data processing apparatus to perform operations comprising encoding the preview object to render a key frame in the display area when the control device is associated with a position outside of the display area.

17. The non-transitory computer-readable medium of claim 16, wherein the key frame is included in the preview object.

18. The non-transitory computer-readable medium of claim 13, wherein the control device comprises a pointing device.

19. The computer program product of claim 13, further operable to cause data processing apparatus to perform operations comprising encoding the preview object for display in the display area such that whatever portion of the plurality of different portions in the single image is displayed fills the entire display area.

20. The non-transitory computer-readable medium of claim 13, wherein concatenating the plurality of frames to form the single image comprises: vertically concatenating the frames to form the single image.

21. The non-transitory computer-readable medium of claim 13, wherein concatenating the plurality of frames to form the single image comprises: horizontally concatenating the frames to form the single image.

22. A system comprising:
    a movie encoded on a computer readable storage device;
    processor electronics configured to perform operations comprising:
    receiving a selection of a plurality of frames of the movie;
    generating a preview object including the plurality of frames, wherein generating the preview object comprises concatenating the plurality of frames to form a single image comprising a plurality of different portions, wherein each portion of the plurality of different portions respectively corresponds to one of the plurality of frames of the movie, wherein concatenating the plurality of frames to form the single image includes vertically or horizontally concatenating the frames to form the single image; and encoding the preview object for display in a display area such that:

based on different positions of a control device within the display area, the different portions of the single image are selected for display in the display area, and only one portion of the plurality of different portions of the single image corresponding to only one of the frames of the movie is displayed in the display area at a time.

23. The system of claim 22, wherein the processor electronics configured to perform operations comprising receiving the selection of the plurality of frames of the movie are further configured to perform operations comprising receiving frames selected at periodic time increments in the movie.

24. The system of claim 22, wherein the processor electronics configured to perform operations comprising generating the preview object are further configured to perform operations comprising arranging the plurality of frames in a temporal order.

25. The system of claim 22, wherein the processor electronics configured to perform operations comprising encoding the preview object for display are further configured to perform operations comprising encoding the preview object to render a key frame in the display area when the control device is associated with a position outside of the display area.

26. The system of claim 25, wherein the key frame is included in the preview object.

27. The system of claim 22, wherein the control device comprises a pointing device.

28. The system of claim 22, wherein the processor electronics are configured to perform operations comprising encoding the preview object for display in the display area such that whatever portion of the plurality of different portions in the single image is displayed fills the entire display area.

29. The system of claim 22, wherein generating the preview object includes concatenating the plurality of frames and additional frames from the movie to form the single image.

30. The system of claim 29, wherein the additional frames are automatically selected from the movie based on one or more criteria.

31. The system of claim 30, wherein generating the preview object includes concatenating the plurality of frames and additional frames from the movie to form the single image.

32. The system of claim 22, wherein concatenating the plurality of frames to form the single image comprises: vertically concatenating the frames to form the single image.

33. The system of claim 22, wherein concatenating the plurality of frames to form the single image comprises: horizontally concatenating the frames to form the single image.

34. A method for generating a media object preview, the method comprising:

generating a preview object including a plurality of frames associated with a media object, wherein generating the preview object comprises concatenating the plurality of frames to form a single image comprising a plurality of different portions, wherein each portion of the plurality of different portions respectively corresponds to one of the plurality of frames of the media object, wherein concatenating the plurality of frames to form the single image includes vertically or horizontally concatenating the frames to form the single image; and encoding the preview object for display in a display area such that:

based on different position inputs associated with the display area, the different portions of the single image are selected for display in the display area, and only one portion of the plurality of different portions of the single image corresponding to only one of the plurality of frames of the media object is displayed in the display area at a time.

35. The method of claim 34, wherein concatenating the plurality of frames to form the single image comprises: vertically concatenating the frames to form the single image.

36. The method of claim 34, wherein concatenating the plurality of frames to form the single image comprises: horizontally concatenating the frames to form the single image.

37. The method of claim 34, wherein the preview object is encoded for display in the display area such that whatever portion of the plurality of different portions in the single image is displayed fills the entire display area.

* * * * *